United States Patent [19]
Lambev

[11] 3,748,920
[45] July 31, 1973

[54] GEAR-TOOTH ARRANGEMENT AND TRANSMISSION INCORPORATING SAME
[75] Inventor: Yordan Gueorguiev Lambev, Sofia, Bulgaria
[73] Assignee: DSO Cherna Metalurgia I Rudobiv, Sofia, Bulgaria
[22] Filed: May 24, 1971
[21] Appl. No.: 146,410

[30] Foreign Application Priority Data
May 28, 1970 Bulgaria.................................. 14803

[52] U.S. Cl.................................... 74/465, 74/417
[51] Int. Cl.......................... F16h 55/06, F16h 1/20
[58] Field of Search...................... 74/464, 465, 417, 74/423

[56] References Cited
UNITED STATES PATENTS
3,108,488  10/1963  Huszar................................. 74/465
1,333,364  3/1920   Albrook................................ 74/465
1,159,486  11/1915  Froelich............................... 74/465
598,629    2/1898   Higgins................................ 74/465
860,536    7/1907   Ellingham............................. 74/465
2,792,715  5/1957   Wojtowicz............................. 74/465

Primary Examiner—Leonard H. Gerin
Attorney—Karl F. Ross

[57] ABSTRACT

A bevel-gear or spur-gear transmission arrangement whose two wheels have beds corresponding to conic and cylinder segments, respectively, along their periphery and receive conical and cylindrical roller bodies. The cylindrical roller bodies form part of a chain while the conical roller bodies have apices lying at the intersection point of the shafts of the two wheels.

2 Claims, 6 Drawing Figures

GEAR-TOOTH ARRANGEMENT AND TRANSMISSION INCORPORATING SAME

This invention relates to a gear-tooth arrangement, which provides a continuous transmission of motion from one shaft to another without any slip.

BACKGROUND OF THE INVENTION

Various types of gear-tooth arrangements are known, including involute, cycloidal, lantern and Novikov tooth arrangements.

General engineering uses primarily involute tooth arrangements. The cycloidal and the lantern tooth designs are used mainly in precision engineering.

In the engineering literature there are many publications dealing with the geometrical characteristics of gear-tooth designs, the methods for calculating and designing the tooth profiles, the methods for calculating and designing the tools for cutting or rolling the teeth and, the methods for calculating the measuring instruments and tools for checking the tooth profile.

The contact strength of the toothed wheels or gears is one of the most important factors influencing their efficiency and determining the resistance of the surface layers of the teeth material against contact destruction.

Such damage is the main cause for the failure of toothed gears, which often have surface hardened teeth and are well lubricated. The analysis of contact damage makes it possible to discern several types of destructions, in which one of the basic causes is increased concentration of the load along the length and the profile of the tooth.

In the known gear-tooth arrangements, with the exception of the Novikov tooth design, the peripheral force of the torque is transmitted from one shaft to the other at the contact lines of the teeth.

Since in most cases the teeth are calculated with regard to bending strength, it has been found that the shape of the tooth is not ideal and the tooth does not possess the required strength properties to provide for the transmission of large forces, while preserving its initial parameters, i.e., the involute and the tooth thickness along the pitch circle.

The analysis of gear transmissions have shown, that regardless of the precise methods for the production of the profile of the teeth, during operation the tooth profile is changed as a result of the relative slip of the teeth one against the other. The change of the tooth profile leads to serious disturbances in the normal operation toothed-gear drive and its premature failure.

In the Novikov tooth the friction losses are lower than in other conventional gear toothings, but the production of gears using this design requires a more complicated technology.

OBJECT OF THE INVENTION

It is therefore a general object of the present invention to provide a gear-tooth arrangement featuring a smooth transmission of the peripheral force from one shaft to the other by means of teeth, which do not contact along a line, but over a surface, so that the tooth profile is not changed even in the case of frictional contact.

BRIEF DESCRIPTION OF THE DRAWING

For a better understanding of the invention, reference is made to the accompanying drawing in which there is illustrated a preferred embodiment of the invention. In the drawings.

SPECIFIC DESCRIPTION

Figure 1:
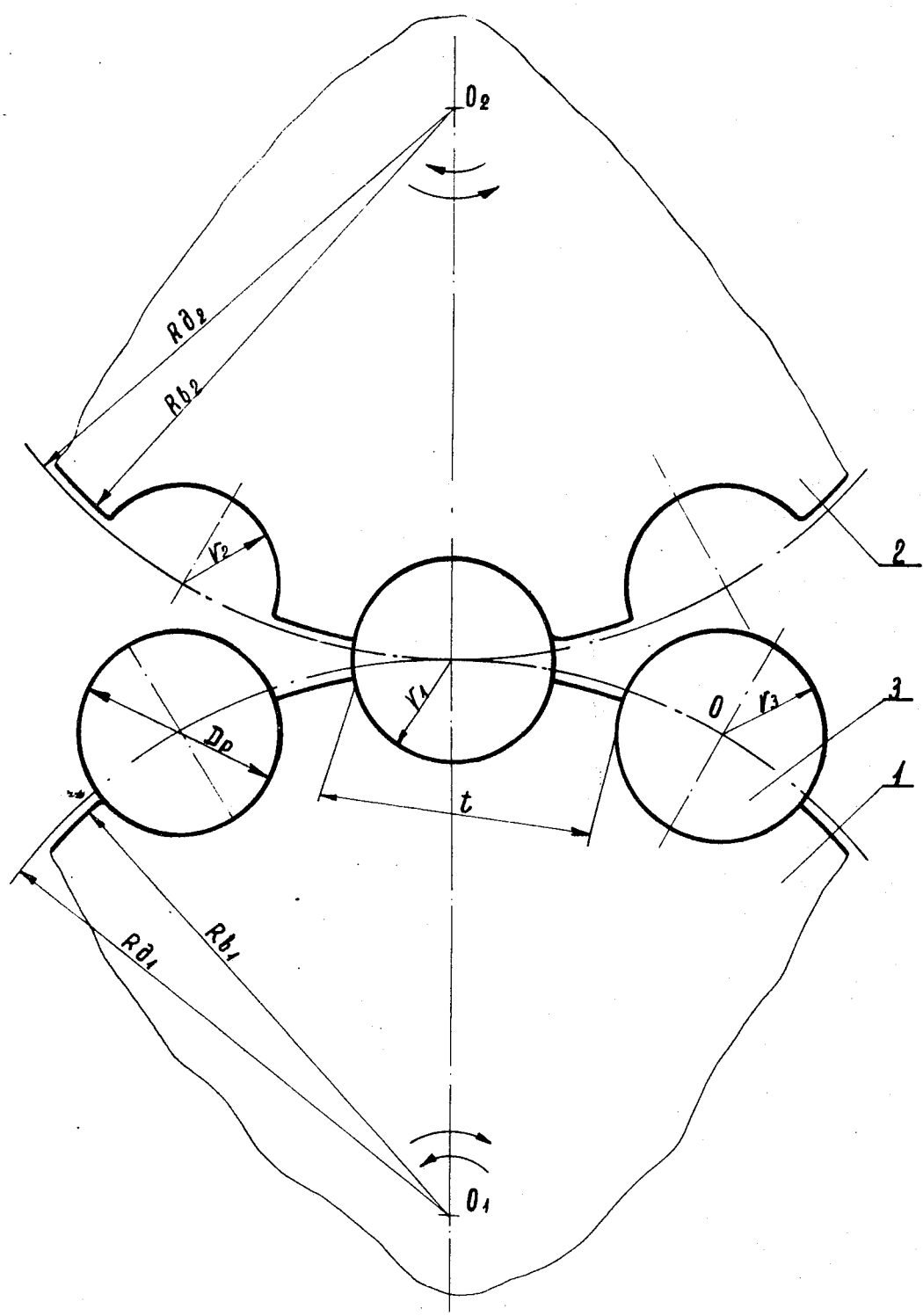
FIG. 1 shows the geometry of the gear-tooth arrangement according to the invention.

As seen in FIG. 1, the toothed wheels 1 and 2 rotate around their axes $0_1$ and $0_2$ respectively. Located in the toothed wheel 1 with a fixed pitch are the rollers 3, which can rotate around their axes $0_3$ ($0_3$ in FIG. 2). The rollers are attached in such manner, that they remain on the periphery of the toothed wheel 1 in the beds with a radius $r_1$, corresponding to the radius $r_3$ of the rollers 3.

When rotating around the axis $0_1$, the rollers 3 on the toothed wheel 1 approach the periphery of wheel 2, which it contacts at one point, and then the roller 3 rolls in its bed and at the crossing the line connecting the axes of rotation 01 and $0_2$, contacts over a cylindrical surface the toothed wheels 1 and 2. Next, the rolling of the roller 3 takes place in the opposite direction and in the second half of the bed in the toothed wheel 2.

Figure 2:
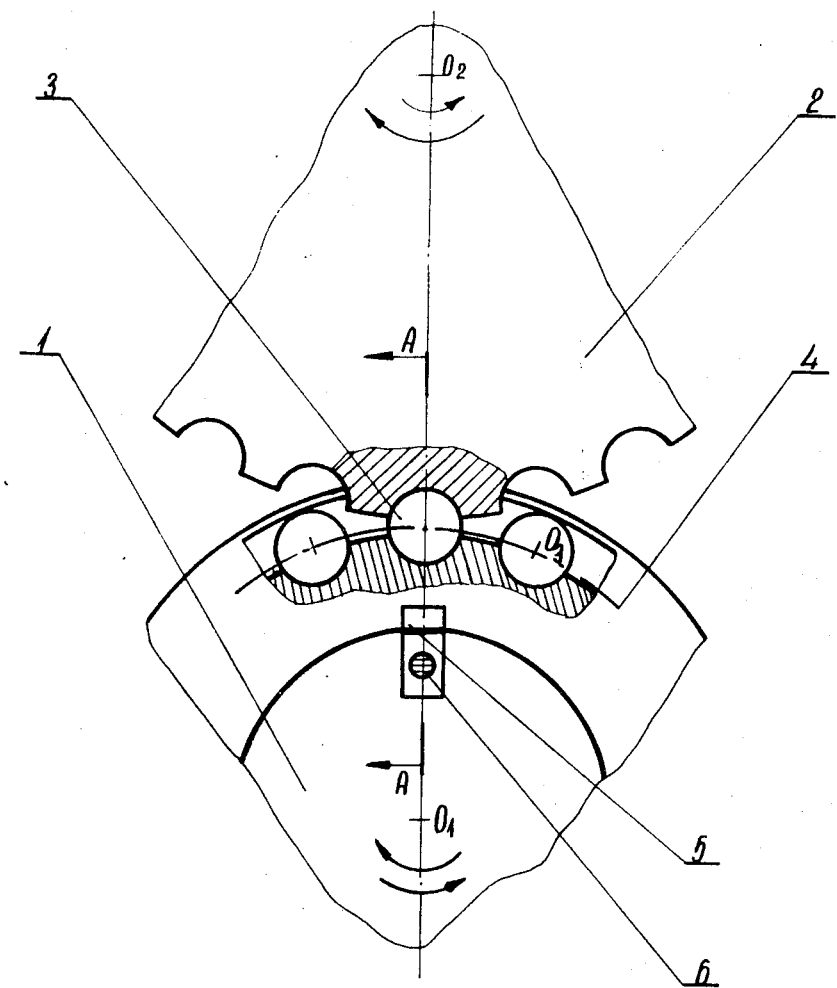
FIG. 2 shows in elevation a portion of a cylindrical gear transmission with spur teeth partly broken away.
Figure 3:
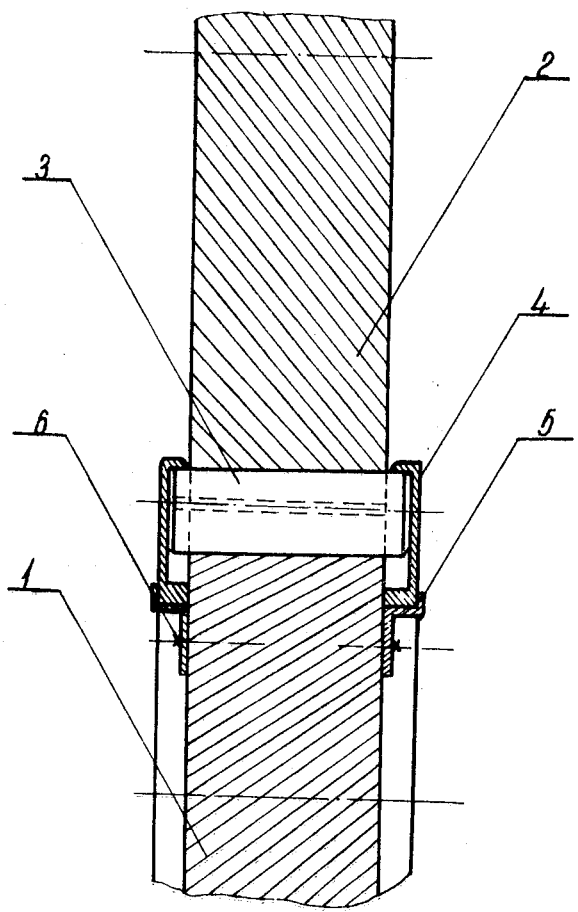
FIG. 3 is a cross-sectional view along line A—A of FIG. 2.

FIGS. 2 and 3 show a cylindrical gear transmission with spur teeth. In this case the toothed wheels 1 and 2 rotate around their axes $0_1$ and $0_2$. Located on the toothed wheel 1 with a fixed pitch are the rollers 3, which can rotate around their axes $0_3$ and rest in beds which have a radius equal to that of the rollers 3. The fixing of the rollers 3 is carried out by means of both flanges 4, embracing the rollers by their outside diameter. The attachment of the flanges 4 to the toothed wheel 1 is carried out by means of the clamps 5 and the screws 6. As can be seen in FIG. 1, the wheels have radii of curvature slightly less than the center to center distance between them while the beds have centers lying osculating circles of greater radius.

Figure 4:
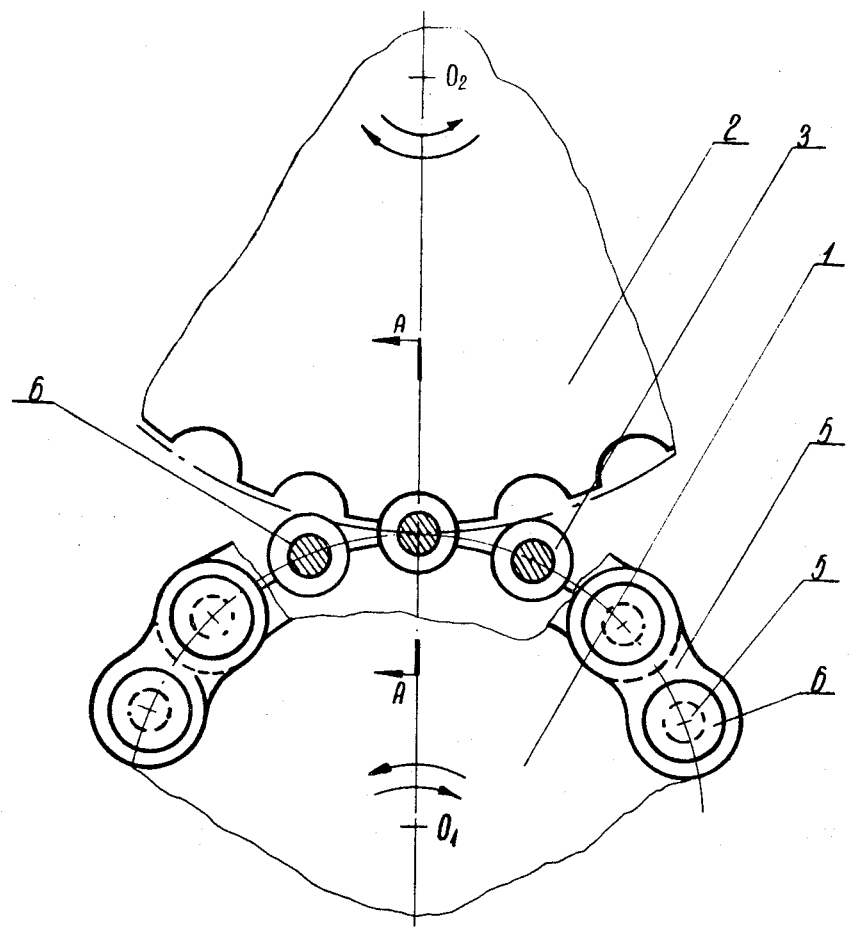
FIG. 4 shows a cylindrical-gear transmission with a sleeve-roller-type chain.
Figure 5:
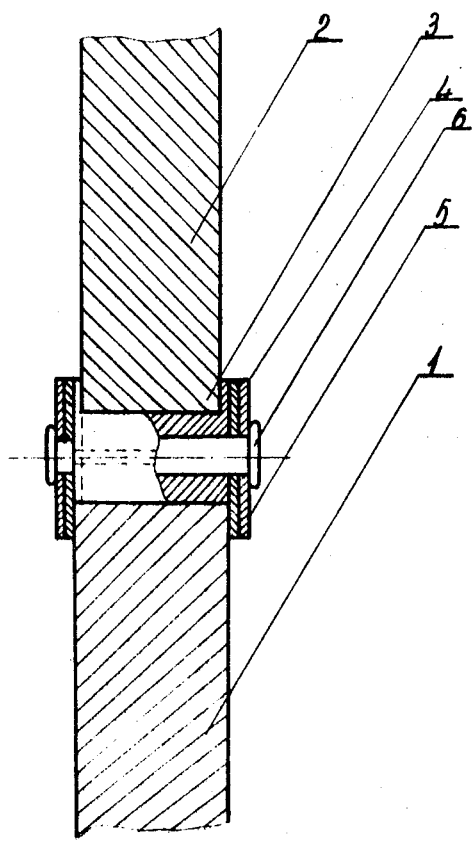
FIG. 5 is a cross-sectional view taken along line A—A of FIG. 4.

FIGS. 4 and 5 show a variant type of a cylindrical gear transmission with a sleeve-roller-type chain, which comprises the following elements: roller 3, inner flat links of the chain 4, outer flat links of the chain and roller axles with ribs 6.

Figure 6:
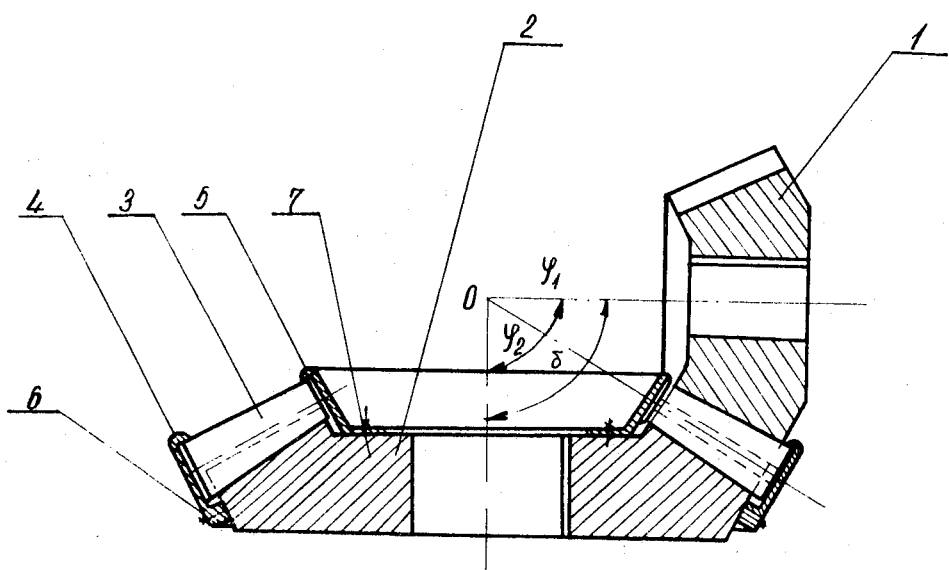
FIG. 6 shows a bevel gear transmission.

FIG. 6 shows a bevel gear transmission. Both bevel toothed wheels 1 and 2 can be engaged at a different angle. e. Used for the transmission of the torque from bevel toothed wheel to the other are the bevel rollers 3, located in bevel beds. The fixing of the bevel rollers 3 is carried out by means of the flanges 4 and 5, attached to the wheel 2 by means of the screws 6 and 7. The rollers 3 can be mounted either to wheel 1 or to toothed wheel 2.

The gear transmission, according to the present invention, can also be embodied as a transmission for transforming the rotational motion into straight-line motion and vice versa, as a gear transmission comprising two cylindrical wheels and a toothed rack.

In another possible variant, one of the toothed wheels 1 or 2 is the driving wheel, and the rotational motion is transformed in a straight-line motion.

As compared with the known gear transmissions, the gear transmission according to the present invention features the following advantages: a higher load-carrying capacity due to the larger contact surface between the teeth of both jointly meshed toothed wheels, and a simpler production technology.

The disclosed gear transmission can find application and metallurgical and heavy engineering, in marine engineering and in other fields of general engineering. It is particularly suitable for the transmission of high torques at low angular velocities.

What is claimed is:

1. A transmission comprising a first wheel having a periphery formed with a multiplicity of equispaced cylindrical outwardly concave beds having axes lying along a cylinder centered on the axis of said wheel and of a greater radius than that of said wheel; a roller chain having a multiplicity of links extending around the periphery of said wheel and provided with respective axles having axes coinciding with those of said beds, and respective cylindrical rollers rotatable on said axles and seated in said beds, said rollers having radii equal to the radii of curvature of said beds; and a second wheel having a periphery formed with a multiplicity of equispaced cylindrical outwardly concave beds having axes lying along a cylinder centered on the axis of said second wheel and of a greater radius than that of said second wheel, the axes of said wheels being coplanar, said axes of said beds coinciding in the plane of the axes of said wheels and said beds of said second wheel having the same radii of curvature as the rollers and the beds of said first wheel.

2. A bevel-gear transmission comprising a first bevel wheel provided with a frustoconical periphery centered on the axis of rotation of said first wheel and formed with a multiplicity of equispaced conical outwardly concave beds having axes lying along a cone coaxial with the axis of said first wheel; respective conical rollers received in said beds and having axes coinciding with those of said beds, said conical rollers projecting axially beyond said beds and being of the same curvature as said beds, said beds having depths less than the radius of curvature thereof; retaining flanges formed on said first wheel and overhanging ends of said rollers projecting axially beyond said beds; and a second bevel wheel having a frustoconical periphery centered on the axis thereof, the axis of said wheels being coplanar and intersecting said periphery of said second wheel being formed with a multiplicity of equispaced conical outwardly concave beds having axes lying along a cone coaxial with the axis of said second wheel and adapted to receive said rollers upon rotation of the beds of said second wheel into the plane of the wheel axes, said beds of said second wheel having the same curvature as said rollers and depths less than the radii of said rollers said rollers and said beds being formed with complementary surfaces lying along respective cones having apices coinciding with the apices of the cones of the bed axes and the intersection point of said wheel axes.

* * * * *